United States Patent
Chen et al.

(10) Patent No.: US 7,392,474 B2
(45) Date of Patent: Jun. 24, 2008

(54) METHOD AND SYSTEM FOR CLASSIFYING DISPLAY PAGES USING SUMMARIES

(75) Inventors: Zheng Chen, Beijing (CN); Dou Shen, Beijing (CN); Benyu Zhang, Beijing (CN); Hua-Jun Zeng, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 679 days.

(21) Appl. No.: 10/836,319

(22) Filed: Apr. 30, 2004

(65) Prior Publication Data

US 2005/0246410 A1 Nov. 3, 2005

(51) Int. Cl.
*G06F 17/00* (2006.01)
(52) U.S. Cl. .................. 715/254; 715/234; 715/277
(58) Field of Classification Search .............. 715/531, 715/205, 209, 234, 254, 276, 277; 707/1–5
See application file for complete search history.

(56) References Cited

U.S. PATENT DOCUMENTS

| | | | |
|---|---|---|---|
| 5,317,507 A | 5/1994 | Gallant | |
| 5,864,855 A | 1/1999 | Ruocco et al. | |
| 5,918,240 A * | 6/1999 | Kupiec et al. | 715/531 |
| 6,359,633 B1 * | 3/2002 | Balasubramaniam et al. | 715/760 |
| 6,606,644 B1 | 8/2003 | Ford et al. | |
| 6,609,124 B2 | 8/2003 | Chow et al. | |
| 7,065,707 B2 * | 6/2006 | Chen et al. | 715/513 |
| 7,120,861 B1 * | 10/2006 | Marukawa | 715/501.1 |
| 7,137,065 B1 * | 11/2006 | Huang et al. | 715/513 |
| 2002/0062302 A1 * | 5/2002 | Oosta | 707/1 |
| 2002/0087326 A1 * | 7/2002 | Lee et al. | 704/270.1 |
| 2002/0138528 A1 * | 9/2002 | Gong et al. | 707/530 |
| 2002/0138529 A1 * | 9/2002 | Yang-Stephens et al. | 707/530 |
| 2002/0169770 A1 * | 11/2002 | Kim et al. | 707/5 |
| 2003/0033274 A1 | 2/2003 | Chow | |
| 2003/0221163 A1 * | 11/2003 | Glover et al. | 715/501.1 |

(Continued)

OTHER PUBLICATIONS

Chen, J., Zhou, B., Shi, J., Zhang, H., and Fengwu, Q. 2001. Function-based object model towards website adaptation. In Proceedings of the 10th international Conference on World Wide Web (Hong Kong, Hong Kong, May 1-5, 2001). WWW '01. ACM Press, New York, NY, 587-596.*

(Continued)

*Primary Examiner*—Doug Hutton
*Assistant Examiner*—James H Blackwell
(74) *Attorney, Agent, or Firm*—Perkins Coie LLP

(57) ABSTRACT

A method and system for classifying display pages based on automatically generated summaries of display pages. A web page classification system uses a web page summarization system to generate summaries of web pages. The summary of a web page may include the sentences of the web page that are most closely related to the primary topic of the web page. The summarization system may combine the benefits of multiple summarization techniques to identify the sentences of a web page that represent the primary topic of the web page. Once the summary is generated, the classification system may apply conventional classification techniques to the summary to classify the web page. The classification system may use conventional classification techniques such as a Naïve Bayesian classifier or a support vector machine to identify the classifications of a web page based on the summary generated by the summarization system.

42 Claims, 9 Drawing Sheets

U.S. PATENT DOCUMENTS

2004/0153309 A1* 8/2004 Lin et al. .................. 704/9

OTHER PUBLICATIONS

Joachims, T. 1998. Text Categorization with Suport Vector Machines: Learning with Many Relevant Features. In Proceedings of the 10th European Conference on Machine Learning (Apr. 21-23, 1998). C. Nedellec and C. Rouveirol, Eds. Lecture Notes In Computer Science, vol. 1398. Springer-Verlag, London, 137-142.*

Paice, C. D. 1981. The automatic generation of literature abstracts: an approach based on the identification of self-indicating phrases. In Proceedings of the 3rd Annual ACM Conference on Research and Development in information Retrieval (Cambridge, England, Jun. 23-27, 1980), pp. 159-165.*

Copernic.com,"Copernic.com Summarization Technologies White Paper", Dec. 2001, 7 pages.*

Ananyan et al.,"Automated Analysis of Natural Language Texts", Mar. 3, 2001, 6 pages.*

Chen, F. R. and Bloomberg, D. S. 1997. Extraction of Indicative Summary Sentences from Imaged Documents. In Proceedings of the 4th international Conference on Document Analysis and Recognition (Aug. 18-20, 1997). ICDAR. IEEE Computer Society, Washington, DC, 227-232.*

H. Saggion et al.,"Multi-Document Summarization by Cluster/Profile Relevance and Redundancy Removal," presented at the HLT/NAACL Annual Meeting, pp. 1-8.*

W. Jung et al.,"Automatic Text Summarization Using Two-Step Sentence Extraction," in Lecture Notes in Computer Science, Feb. 14, 2005, pp. 71-81.*

Y. Seki,"Sentence Extraction by tf/idf and POsition Weighting from Newspaper Articles," 2003, Proc. 3$^{rd}$ NTCIR Workshop, 6 pages.*

Buyukkokten, O., Garcia-Molina, H., and Paepcke, A. 2001. Seeing the whole in parts: text summarization for web browsing on handheld devices. In Proceedings of the 10th international Conference on World Wide Web (Hong Kong, May 1-5, 2001). WWW '01. ACM, New York, NY, pp. 652-662.*

V. Hatzivassiloglou, J. L. Klavans, M. L. Holcombe, R. Barzilay, M.-Y. Kan, and K. R. McKeown. Simfinder: A flexible clustering tool for summarization. In NAACL Workshop on Automatic Summarization, pp. 41-49. Association for Computational Linguistics, 2001.*

Gong, Yihong and Liu, Xin, "Generic Text Summarization Using Relevance Measure and Latent Semantic Analysis," SIGIR '01, Sep. 9-12, 2001, New Orleans, Louisiana, Copyright 2001 (7 pages).

Berger, Adam, L. and Mittal, Vibhu O., "OCELOT: A System for Summarizing Web Pages," School of Computer Science, Carnegie Mellon University, Pittsburgh, Pennsylvania, Copyright 2000 (8 pages).

Schultz, J. Michael and Liberman, Mark "Topic Detection and Tracking Using idf-Weighted Cosine Coefficient," University of Pennsylvania, Philadelphia, Pennsylvania, DARPA Broadcast News Workshop Proceedings, 1999 (5 pages).

Wang, Xuanhui et al., "Web Page Clustering Enhanced by Summarization," CIKM, Online!, Nov. 8, 2004 (pp. 242-243).

Chue, W.L., et al., "SVD: A Novel Content-Based Representation Technique for Web Documents," Information, Communications and Signal Processing, 2003 and Fourth Pacific Rim Conference on Multimedia, Proceedings of the Fourth INternaitonal Conference on Singapore, Dec. 15-18, 2003 (pp. 1840-1844).

Mazdak, Nima, "FarsiSum: A Persian Text Summarizer," Master Thesis, OnLine!, Jan. 2004 (pp. 1-52).

European Search Report for EP Application No. 05 10 3580, Sep. 19, 2005 (3 pages).

* cited by examiner

METHOD AND SYSTEM FOR CLASSIFYING DISPLAY PAGES USING SUMMARIES

TECHNICAL FIELD

The described technology relates generally to automatically classifying information.

BACKGROUND

Many search engine services, such as Google and Overture, provide for searching for information that is accessible via the Internet. These search engine services allow users to search for display pages, such as web pages, that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match, web page popularity (e.g., Google's PageRank), and so on. The search engine service then displays to the user links to those web pages in an order that is based on their rankings.

Although search engine services may return many web pages as a search result, the presenting of the web pages in rank order may make it difficult for a user to actually find those web pages of particular interest to the user. Since the web pages that are presented first may be directed to popular topics, a user who is interested in an obscure topic may need to scan many pages of the search result to find a web page of interest. To make it easier for a user to find web pages of interest, the web pages of a search result could be presented in a hierarchical organization based on some classification or categorization of the web pages. For example, if a user submits a search request of "court battles," the search result may contain web pages that can be classified as sports-related or legal-related. The user may prefer to be presented initially with a list of classifications of the web pages so that the user can select the classification of web pages that is of interest. For example, the user might be first presented with an indication that the web pages of the search result have been classified as sports-related and legal-related. The user can then select the legal-related classification to view web pages that are legal-related. In contrast, since sports web pages are more popular than legal web pages, a user might have to scan many pages to find legal-related web pages if the most popular web pages are presented first.

It would be impractical to manually classify the millions of web pages that are currently available. Although automated classification techniques have been used to classify text-based content, those techniques are not generally applicable to the classification of web pages. Web pages have an organization that includes noisy content, such as an advertisement or a navigation bar, that is not directly related to the primary topic of the web page. Because conventional text-based classification techniques would use such noisy content when classifying a web page, these techniques would tend to produce incorrect classifications of web pages.

It would be desirable to have a classification technique for web pages that would base the classification of a web page on the primary topic of the web page and give little weight to noisy content of the web page.

SUMMARY

A classification and summarization system classifies display pages such as web pages based on automatically generated summaries of the display pages. In one embodiment, a web page classification system uses a web page summarization system to generate summaries of web pages. The summary of a web page may include the sentences of the web page that are most closely related to the primary topic of the web page. The summarization system may combine the benefits of multiple summarization techniques to identify the sentences of a web page that represent the primary topic of the web page. Once a summary is generated, the classification system may apply conventional classification techniques to the summary to classify the web page.

DETAILED DESCRIPTION

Figure 1:
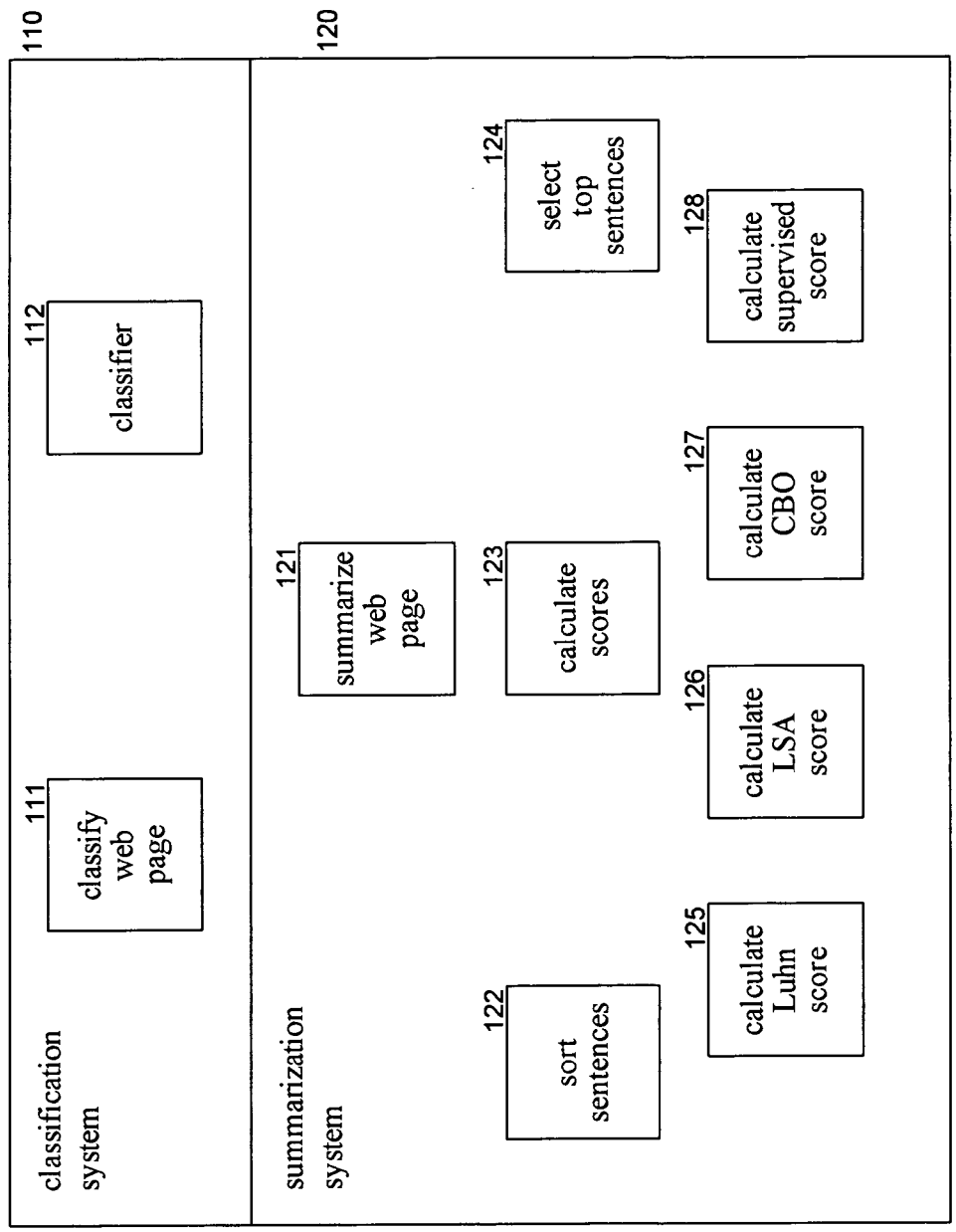
FIG. 1 is block diagram that illustrates components of a classification system and a summarization system in one embodiment.

A method and system for classifying display pages based on automatically generated summaries of display pages is provided. In one embodiment, a web page classification system uses a web page summarization system to generate summaries of web pages. The summary of a web page may include the sentences of the web page that are most closely related to the primary topic of the web page. Once the summary is generated, the classification system may apply conventional classification techniques to the summary to classify the web page. The summarization system may combine the benefits of multiple summarization techniques to identify the sentences of a web page that represent the primary topic of the web page. In one embodiment, the summarization system uses a Luhn summarization technique, a latent semantic analysis summarization technique, a content body summarization technique, and a supervised summarization technique either individually or in combination to generate a summary.

The summarization system uses each of the summarization techniques to generate a summarization technique-specific score for each sentence of a web page. The summarization system then combines the summarization technique-specific scores for a sentence to generate an overall score for that sentence. The summarization system selects the sentences of the web page with the highest overall scores to form the summary of the web page. The classification system may use conventional classification techniques such as a Naïve Bayesian classifier or a support vector machine to identify the classifications of a web page based on the summary generated by the summarization system. In this way, web pages can be automatically classified based on automatically generated summaries of the web pages.

In one embodiment, the summarization system uses a modified version of the Luhn summarization technique to generate a Luhn score for each sentence of a web page. The Luhn summarization technique generates a score for a sentence that is based on the "significant words" that are in the sentence. To generate a score for a sentence, the Luhn summarization technique identifies a portion of the sentence that is bracketed by significant words that are not more than a certain number of non-significant words apart. The Luhn summarization technique calculates the score of the sentence as the ratio of the square of the number of significant words contained in the bracketed portion divided by the number of words within the bracketed portion. (See H. P. Luhn, *The Automatic Creation of Literature Abstracts*, 2 IBM J. OF RES. & DEV. No. 2, 159-65 (April 1958).) The summarization system modifies the Luhn summarization technique by defining a collection of significant words for each classification. For example, a sports-related classification may have a collection of significant words that includes "court," "basketball," and "sport," whereas a legal-related classification may have a collection of significant words that includes "court," "attorney," and "criminal." The summarization system may identify the collections of significant words based on a training set of web pages that have been pre-classified. The summarization system may select the most frequently used words on the web pages with a certain classification as the collection of significant words for that classification. The summarization system may also remove certain stop words from the collection that may represent noisy content. When scoring a sentence of a web page, the modified Luhn summarization technique calculates a score for each classification. The summarization technique then averages the scores for each classification that are above a threshold level to give a combined Luhn score for the sentence. The summarization system may select the sentences with the highest Luhn scores to form the summary.

In one embodiment, the summarization system uses a latent semantic analysis summarization technique to generate a latent semantic analysis score for each sentence of a web page. The latent semantic analysis summarization technique uses singular value decomposition to generate a score for each sentence. The summarization system generates a word-sentence matrix for the web page that contains a weighted term-frequency value for each word-sentence combination. The matrix may be represented by the following:

$$A = U\Sigma V^T \quad (1)$$

where A represents the word-sentence matrix, U is a column-orthonormal matrix whose columns are left singular vectors, $\Sigma$ is a diagonal matrix whose diagonal elements are non-negative singular values sorted in descending order, and V is an orthonormal matrix whose columns are right singular vectors. After decomposing the matrix into U, $\Sigma$, and V, the summarization system uses the right singular vectors to generate the scores for the sentences. (See Y. H. Gong & X. Liu, *Generic Text Summarization Using Relevance Measure and Latent Semantic Analysis*, in PROC. OF THE 24$^{TH}$ ANNUAL INTERNATIONAL ACM SIGIR, New Orleans, La., 19-25 (2001).) The summarization system may select the first right singular vector and select the sentence that has the highest index value within that vector. The summarization system then gives that sentence the highest score. The summarization system then selects the second right singular vector and gives the sentence that has the highest index value within that vector the second highest score. The summarization system then continues in a similar manner to generate the scores for the other sentences. The summarization system may select the sentences with the highest scores to form the summary of the web page.

In one embodiment, the summarization system uses a content body summarization technique to generate a content body score for each sentence of a web page. The content body summarization technique identifies the content body of a web page and gives a high score to the sentences within the content body. To identify the content body of a web page, the content body summarization technique identifies basic objects and composite objects of the web page. A basic object is the smallest information area that cannot be further divided. For example, in HTML, a basic object is a non-breakable element within two tags or an embedded object. A composite object is a set of basic objects or other composite objects that combine to perform a function. After identifying the objects, the summarization system categorizes the objects into categories such as information, navigation, interaction, decoration, or special function. The information category is for objects that present content information, the navigation category is for objects that present a navigation guide, the interaction category is for objects that present user interactions (e.g., input field), the decoration category is for objects that present decorations, and a special function category is for objects that present information such as legal information, contact information, logo information, and so on. (See J. L. Chen, et al., *Function-based Object Model Towards Website Adaptation*, PROC. OF WWW10, Hong Kong, China (2001).) In one embodiment, the summarization system builds a term frequency by inverted document frequency index (i.e., TF*IDF) for each object. The summarization system then calculates the similarity between pairs of objects using a similarity computation such as cosine similarity. If the similarity between the objects of the pair is greater than a threshold level, the summarization system links the objects of the pair. The summarization system then identifies the object that has the most links to it as the core object that represents the primary topic of the web page. The content body of the web page is the core object along with each object that has a link to the core object. The summarization system gives a high score to each sentence of the content body and a low score to every other sentence of the web page. The summarization system may select the sentences with a high score to form the summary of the web page.

In one embodiment, the summarization system uses a supervised summarization technique to generate a supervised score for each sentence of a web page. The supervised summarization technique uses training data to learn a summarize function that identifies whether a sentence should be selected as part of a summary. The supervised summarization technique represents each sentence by a feature vector. In one embodiment, the supervised summarization technique uses the features defined in Table 1 where $f_{ij}$ represents the value of the ith feature of sentence i.

TABLE 1

| Feature | Description |
| --- | --- |
| $f_{i1}$ | the position of a sentence $S_i$ in its containing paragraph. |
| $f_{i2}$ | the length of a sentence $S_i$ which is the number of words in $S_i$. |
| $f_{i3}$ | $\Sigma\, TF_w * SF_w$, which takes into account not only the number of words w into consideration, but also its distribution among sentences where $TF_w$ is the number of occurrences of word w in a target web page and where $SF_w$ is the number of sentences including the word w in the target web page. |
| $f_{i4}$ | the similarity between $S_i$ and the title, which may be calculated as the dot product between the sentence and the title. |
| $f_{i5}$ | the cosine similarity between $S_i$ and all text in the web page. |
| $f_{i6}$ | the cosine similarity between $S_i$ and metadata of the web page. |
| $f_{i7}$ | the number of occurrences of a word from a special word set that are in $S_i$. The special word set may be built by collecting the words in the web page that are highlighted (e.g., italicized, bold faced, or underlined). |
| $f_{i8}$ | the average font size of the words in $S_i$. In general, larger font size in a web page is given higher importance. |

The summarization system may use a Naïve Bayesian classifier to learn the summarize function. The summarize function can be represented by the following:

$$p(s \in S \mid f_1, f_2 \ldots f_8) = \frac{\prod_{j=1}^{8} p(f_j \mid s \in S) p(s \in S)}{\prod_{j=1}^{8} p(f_j)} \quad (2)$$

where p(sϵS) stands for the compression rate of the summarizer (which can be predefined for different applications), $p(f_j)$ is the probability of each feature j, and $p(f_j|s \epsilon S)$ is the conditional probability of each feature j. The latter two factors can be estimated from the training set.

In one embodiment, the summarization system combines the scores of the Luhn summarization technique, the latent semantic analysis summarization technique, the content body summarization technique, and the supervised summarization technique to generate an overall score. The scores may be combined as follows:

$$S = S_{luhn} + S_{lsa} + S_{cb} + S_{sup} \quad (3)$$

where S represents the combined score, $S_{luhn}$ represents the Luhn score, $S_{lsa}$ represents the latent semantic analysis score, $S_{cb}$ represents the content body score, and $S_{sup}$ represents the supervised score. Alternatively, the summarization system may apply a weighting factor to each summarization technique score so that not all the summarization technique scores are weighted equally. For example, if the Luhn score is thought to be a more accurate reflection of the relatedness of a sentence to the primary topic of the web page, then the weighting factor for the Luhn score might be 0.7 and the weighting factor for the other scores might be 0.1 each. If a weighting factor for a summarization technique is set to zero, then the summarization system does not use that summarization technique. One skilled in the art will appreciate that any number of the summarization techniques can have their weights set to zero. For example, if a weighting factor of 1 is used for the Luhn score and for zero for the other scores, then the "combined" score would be simply the Luhn score. In addition, the summarization system may normalize each of the summarization technique scores. The summarization system may also use a non-linear combination of the summarization technique scores. The summarization system may select the sentences with the highest combined scores to form the summary of the web page.

In one embodiment, the classification system uses a Naïve Bayesian classifier to classify a web page based on its summary. The Naïve Bayesian classifier uses Bayes' rule, which may be defined as follows:

$$P(c_j \mid d_i; \hat{\theta}) = \frac{P(c_j \mid \hat{\theta}) \prod_{k=1}^{n} P(w_k \mid c_j; \hat{\theta})^{N(w_k, d_i)}}{\sum_{r=1}^{|C|} P(c_r \mid \hat{\theta}) \prod_{k=1}^{n} P(w_k \mid c_r; \hat{\theta})^{N(w_k, d_i)}} \quad (4)$$

where $P(c_j|d_i;\hat{\theta})$ can be calculated by counting the frequency with each category $c_j$ occurring in the training data, |C| is the number of categories, $p(w_i|c_j)$ is a probability that word $w_i$ occurs in class $c_j$, $N(w_k,d_i)$ is the number of occurrences of a word $w_k$ in $d_i$, and n is the number of words in the training data. (See A. McCallum & K. Nigam, *A Comparison of Event Models for Naïve Bayes Text Classification*, in AAAI-98 WORKSHOP ON LEARNING FOR TEXT CATEGORIZATION (1998).) Since $w_i$ may be small in the training data, a Laplace smoothing may be used to estimate its value.

In an alternate embodiment the classification system uses a support vector machine to classify a web page based on its summary. A support vector machine operates by finding a hyper-surface in the space of possible inputs. The hyper-surface attempts to split the positive examples from the negative examples by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.micro-soft.com/~jplatt/smo.html.)

FIG. 1 is block diagram that illustrates components of a classification system and a summarization system in one embodiment. The classification system 110 includes a classify web page component 111 and a classifier component 112. The summarization system 120 includes a summarize web page component 121, a sort sentences component 122, a calculate scores component 123, and a select top sentences component 124. The classify web page component uses the summarize web page component to generate a summary for a web page and then uses the classifier component to classify the web page based on the summary. The summarize web page component uses the calculate scores component to calculate a score for each sentence of the web page. The summarize web page component then uses the sort sentences component to sort the sentences of the web page based on their scores and the select top sentences component to select the sentences with the highest scores to form the summary of the web page. The calculate scores component uses a calculate Luhn score component 125, a calculate latent semantic analysis score component 126, a calculate content body score component 127, and a calculate supervised score component 128 to generate scores for various summarization techniques. The calculate scores component then combines the scores for the summarization techniques to provide an overall score for each sentence.

The computing device on which the summarization system is implemented may include a central processing unit, memory, input devices (e.g., keyboard and pointing devices), output devices (e.g., display devices), and storage devices (e.g., disk drives). The memory and storage devices are computer-readable media that may contain instructions that implement the summarization system. In addition, the data structures and message structures may be stored or transmitted via a data transmission medium, such as a signal on a communications link. Various communications links may be used, such as the Internet, a local area network, a wide area network, or a point-to-point dial-up connection.

The summarization system may be implemented in various operating environments. The operating environment described herein is only one example of a suitable operating environment and is not intended to suggest any limitation as to the scope of use or functionality of the summarization system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The summarization system may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Figure 2:
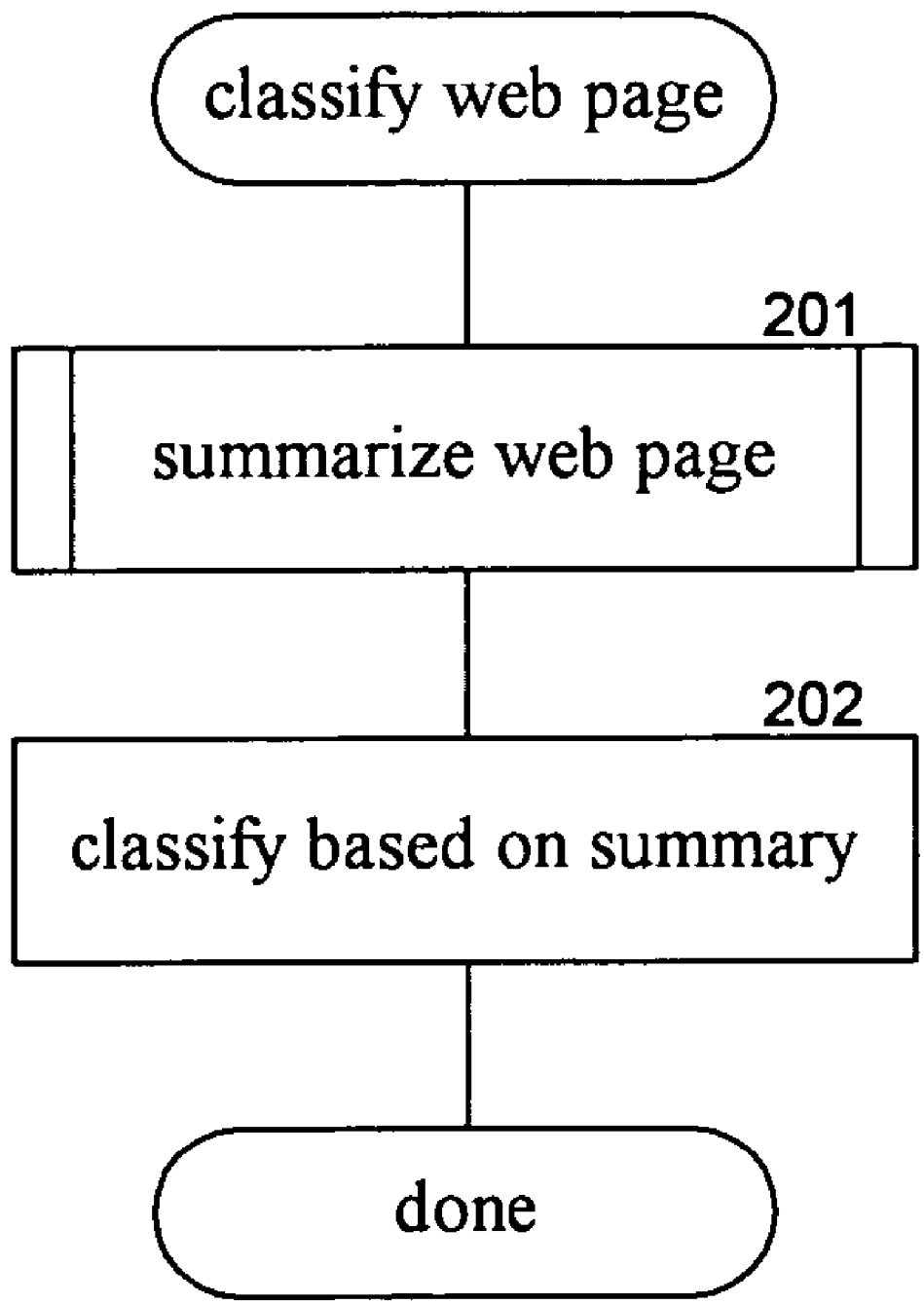
FIG. 2 is a flow diagram that illustrates the processing of the classify web page component in one embodiment.

FIG. 2 is a flow diagram that illustrates the processing of the classify web page component in one embodiment. The component is passed a web page and returns its classifications. In block 201, the component invokes the summarize web page component to generate a summary for the web page. In block 202, the component classifies the web page based on the summary of the web page using a classifier such as a Naïve Bayesian classifier or a support vector machine. The component then completes.

Figure 3:
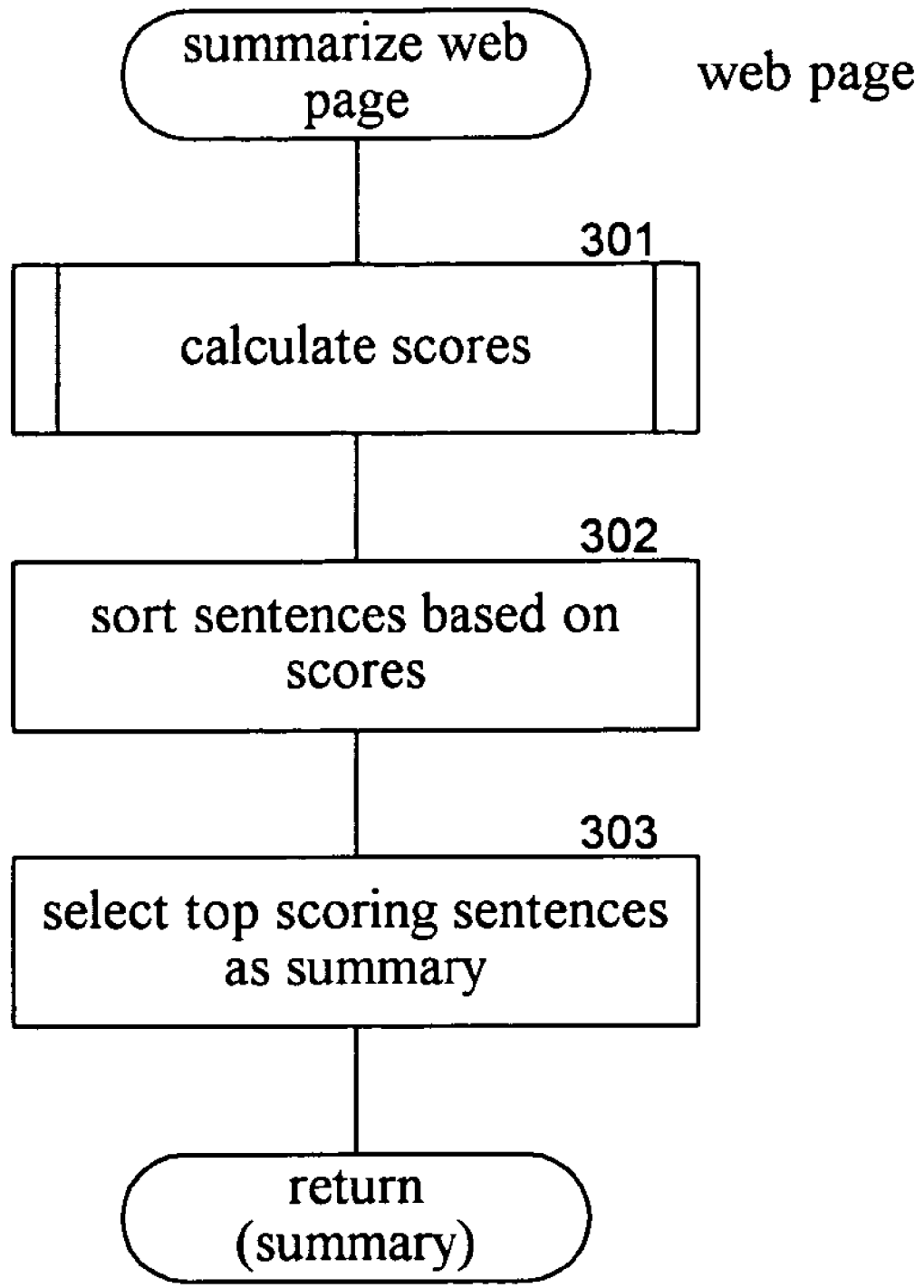
FIG. 3 is a flow diagram that illustrates the processing of the summarize web page component in one embodiment.

FIG. 3 is a flow diagram that illustrates the processing of the summarize web page component in one embodiment. The component is passed a web page, calculates a score for each sentence of the web page, and selects the sentences with the highest scores to form the summary of the web page. In block 301, the component invokes the calculate scores component to calculate a score for each sentence. In block 302, the component sorts the sentences based on the calculated scores. In block 303, the component selects the sentences with the top scores to form the summary for the web page. The component then returns the summary.

Figure 4:
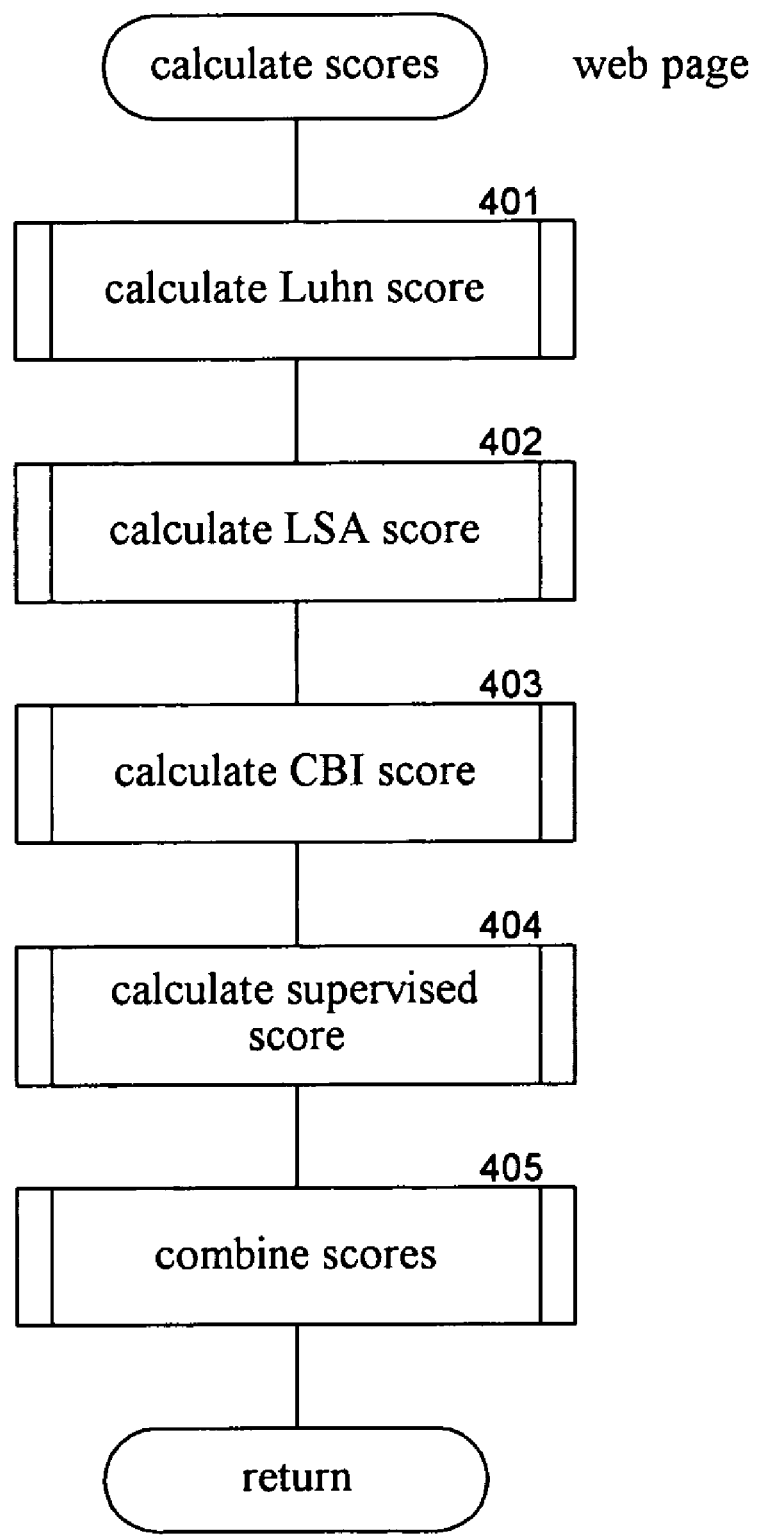
FIG. 4 is a flow diagram that illustrates the processing of the calculate scores component in one embodiment.

FIG. 4 is a flow diagram that illustrates the processing of the calculate scores component in one embodiment. The component is passed a web page, calculates various summarization technique scores for the sentences of the web page, and calculates a combined score for each sentence based on those summarization technique scores. The component may alternatively calculate a score using only one summarization technique or various combinations of the summarization techniques. In block 401, the component invokes the calculate Luhn score component to calculate a Luhn score for each sentence of the web page. In block 402, the component invokes the calculate latent semantic analysis score component to calculate a latent semantic analysis score for each sentence of the web page. In block 403, the component invokes the calculate content body score component to calculate a content body score for each sentence of the web page. In block 404, the component invokes the calculate supervised score component to calculate a supervised score for each sentence of the web page. In block 405, the component invokes a combine scores component to calculate a combined score for each sentence of the web page. The component then returns the combined scores.

Figure 5:
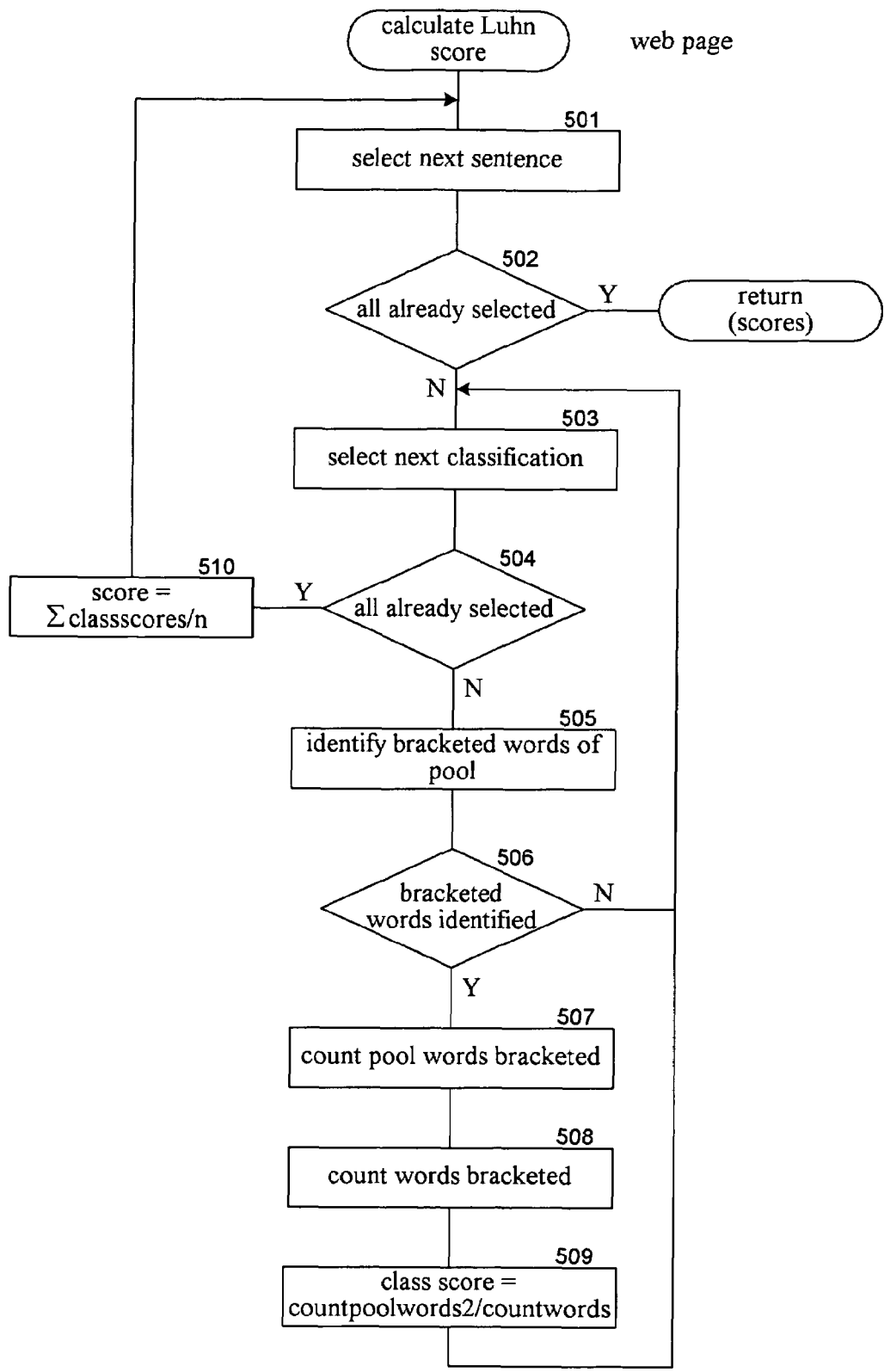
FIG. 5 is a flow diagram that illustrates the processing of the calculate Luhn score component in one embodiment.

FIG. 5 is a flow diagram that illustrates the processing of the calculate Luhn score component in one embodiment. The component is passed a web page and calculates a Luhn score for each sentence of the passed web page. In block 501, the component selects the next sentence of the web page. In decision block 502, if all the sentences of the web page have already been selected, then the component returns the Luhn scores, else the component continues at block 503. In blocks 503-509, the component loops generating a class score for the selected sentence for each classification. In block 503, the component selects the next classification. In decision block 504, if all the classifications have already been selected, then the component continues at block 510, else the component continues at block 505. In block 505, the component identifies words of the selected sentence that are bracketed by significant words of the selected classification. In decision block 506, if bracketed words are identified, then the component continues at block 507, else the component loops to block 503 to select the next classification. In block 507, the component counts the significant words within the bracketed portion of the selected sentence. In block 508, the component counts the words within the bracketed portion of the selected sentence. In block 509, the component calculates a score for the classification as the square of the count of significant words divided by the count of words. The component then loops to block 503 to select the next classification. In block 510, the component calculates the Luhn score for the selected sentence as a sum of the class scores divided by the number of classifications for which a bracketed portion of the selected sentence was identified (i.e., the average of the class scores that were calculated). The component then loops to block 501 to select the next sentence.

Figure 6:
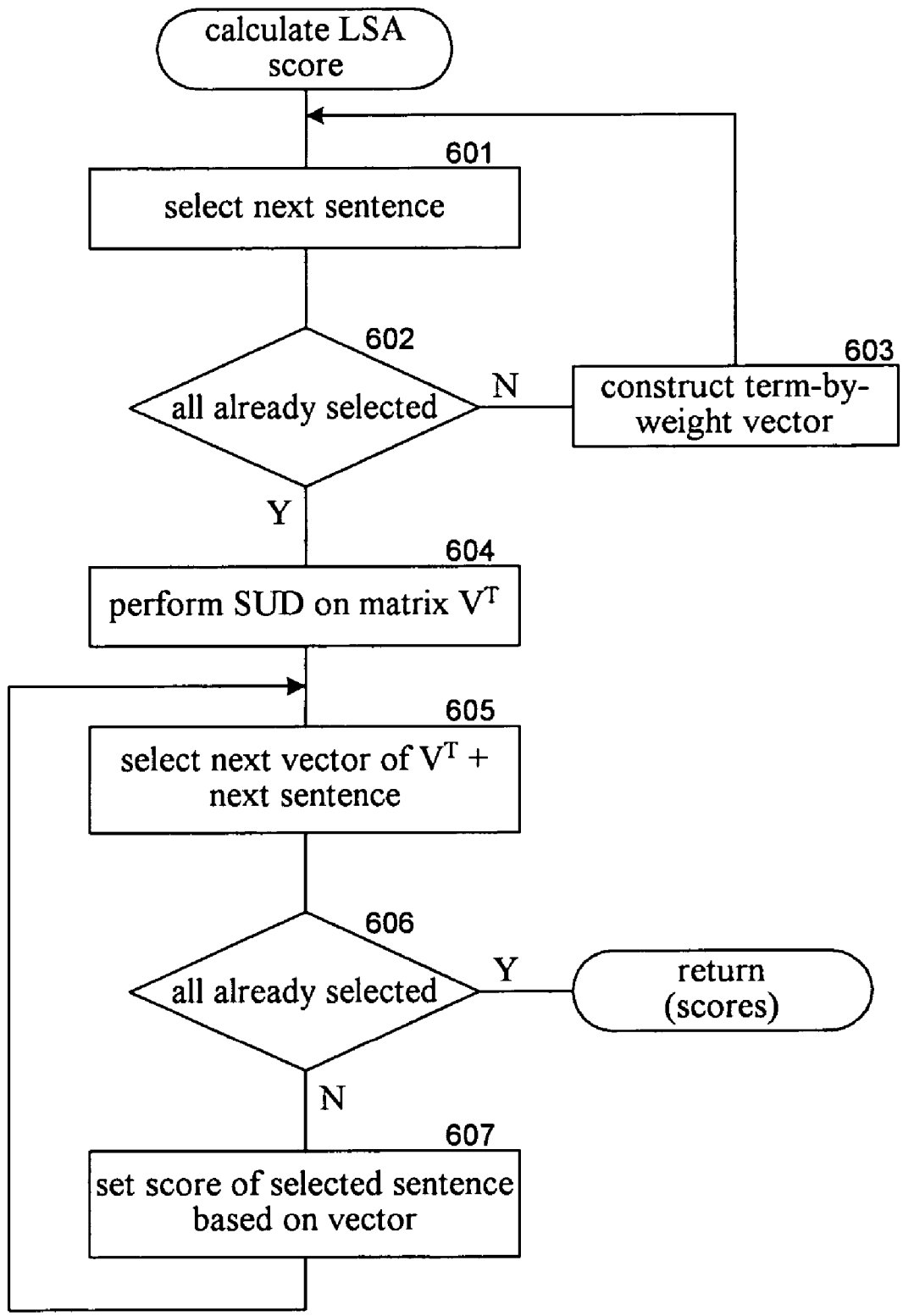
FIG. 6 is a flow diagram that illustrates the processing of the calculate latent semantic analysis score component in one embodiment.

FIG. 6 is a flow diagram that illustrates the processing of the calculate latent semantic analysis score component in one embodiment. The component is passed a web page and calculates a latent semantic analysis score for each sentence of the passed web page. In blocks 601-603, the component loops constructing a term-by-weight vector for each sentence of the web page. In block 601, the component selects the next sentence of the web page. In decision block 602, if all the sentences of the web page have already been selected, then the component continues at block 604, else the component continues at block 603. In block 603, the component constructs a term-by-weight vector for the selected sentence and then loops to block 601 to select the next sentence. The term-by-weight vectors for the sentences form a matrix that is decomposed to give a matrix of right singular vectors. In block 604, the component performs singular value decomposition of that matrix to generate the right singular vectors. In blocks 605-607, the component loops setting a score for each sentence based on the right singular vectors. In block 605, the component selects the next right singular vector. In decision block 606, if all the right singular vectors have already been selected, then the component returns the scores as the latent semantic analysis scores, else the component continues at block 607. In block 607, the component sets the score of the sentence with the highest index value of the selected right singular vector and then loops to block 605 to select the next right singular vector.

Figure 7:
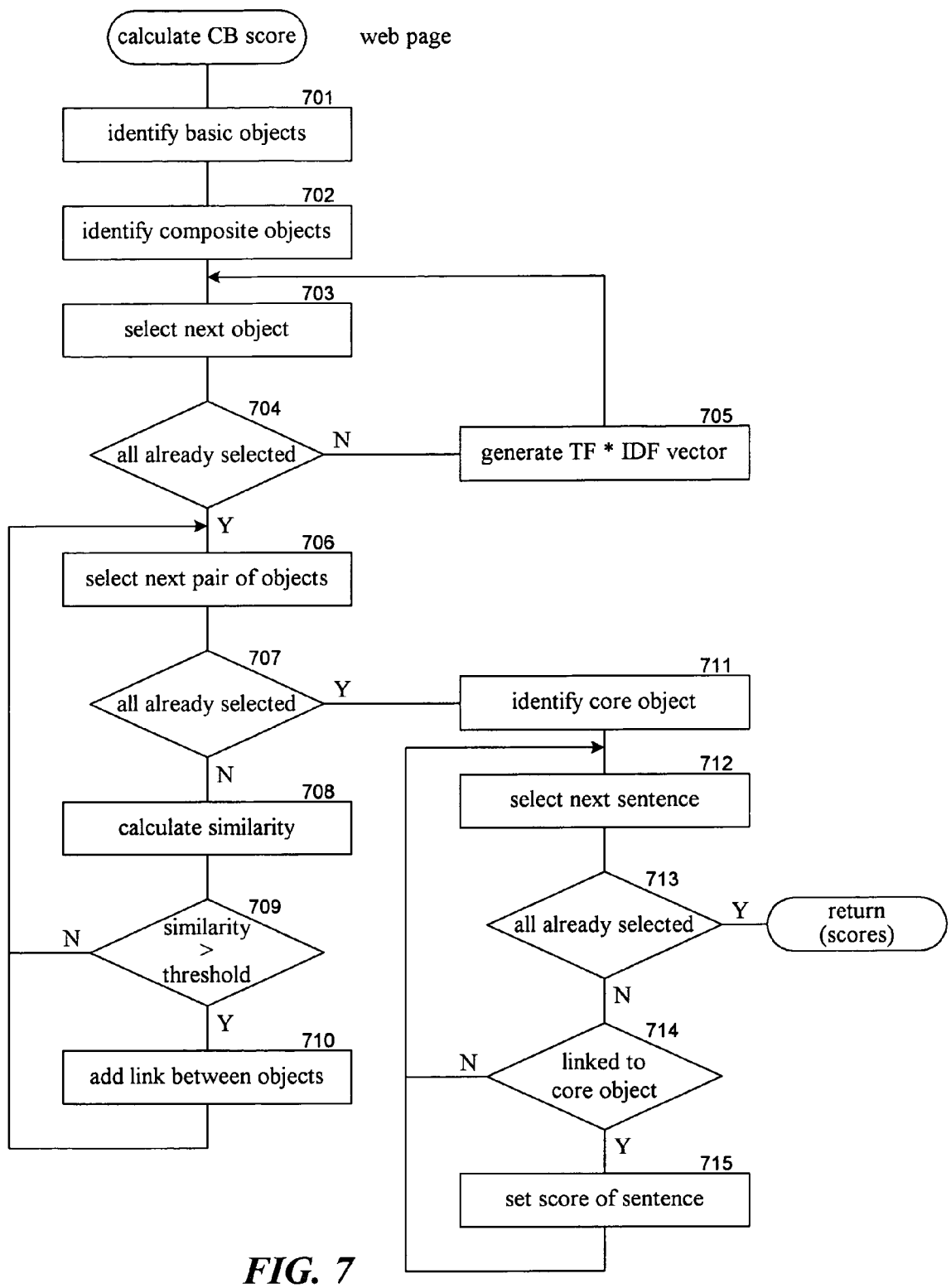
FIG. 7 is a flow diagram that illustrates the processing of the calculate content body score component in one embodiment.

FIG. 7 is a flow diagram that illustrates the processing of the calculate content body score component in one embodiment. The component is passed a web page and calculates a content body score for each sentence of the passed web page. In block 701, the component identifies the basic objects of the web page. In block 702, the component identifies the composite objects of the web page. In blocks 703-705, the component loops generating a term frequency/inverted document frequency vector for each object. In block 703, the component selects the next object. In decision block 704, if all the objects have already been selected, then the component continues at block 706, else the component continues at block 705. In block 705, the component generates the term frequency/inverted document frequency vector for the selected object and then loops to block 703 to select the next object. In blocks 706-710, the component loops calculating the similarity between pairs of objects. In block 706, the component selects the next pair of objects. In decision block 707, if all the pairs of objects have already been selected, then the component continues at block 711, else the component continues at block 708. In block 708, the component calculates the similarity between the selected pair of objects. In decision block 709, if the similarity is higher than a threshold level of similarity, then the component continues at block 710, else the component loops to block 706 to select the next pair of objects. In block 710, the component adds a link between the selected pair of objects and then loops to block 706 to select the next pair of objects. In blocks 711-715, the component identifies the content body of the web page by identifying a core object and all objects with links to that core object. In block 711, the component identifies the core object as the object with the greatest number of links to it. In block 712, the component selects the next sentence of the web page. In decision block 713, if all the sentences have already been selected, then the component returns the content body scores, else the component continues at block 714. In decision block 714, if the sentence is within an object that is linked to the core object, then the sentence is within the content body and the component continues at block 715, else the component sets the score of the selected sentence to zero and loops to block 712 to select the next sentence. In block 715, the component sets the score of the selected sentence to a high score and then loops to block 712 to select the next sentence.

Figure 8:
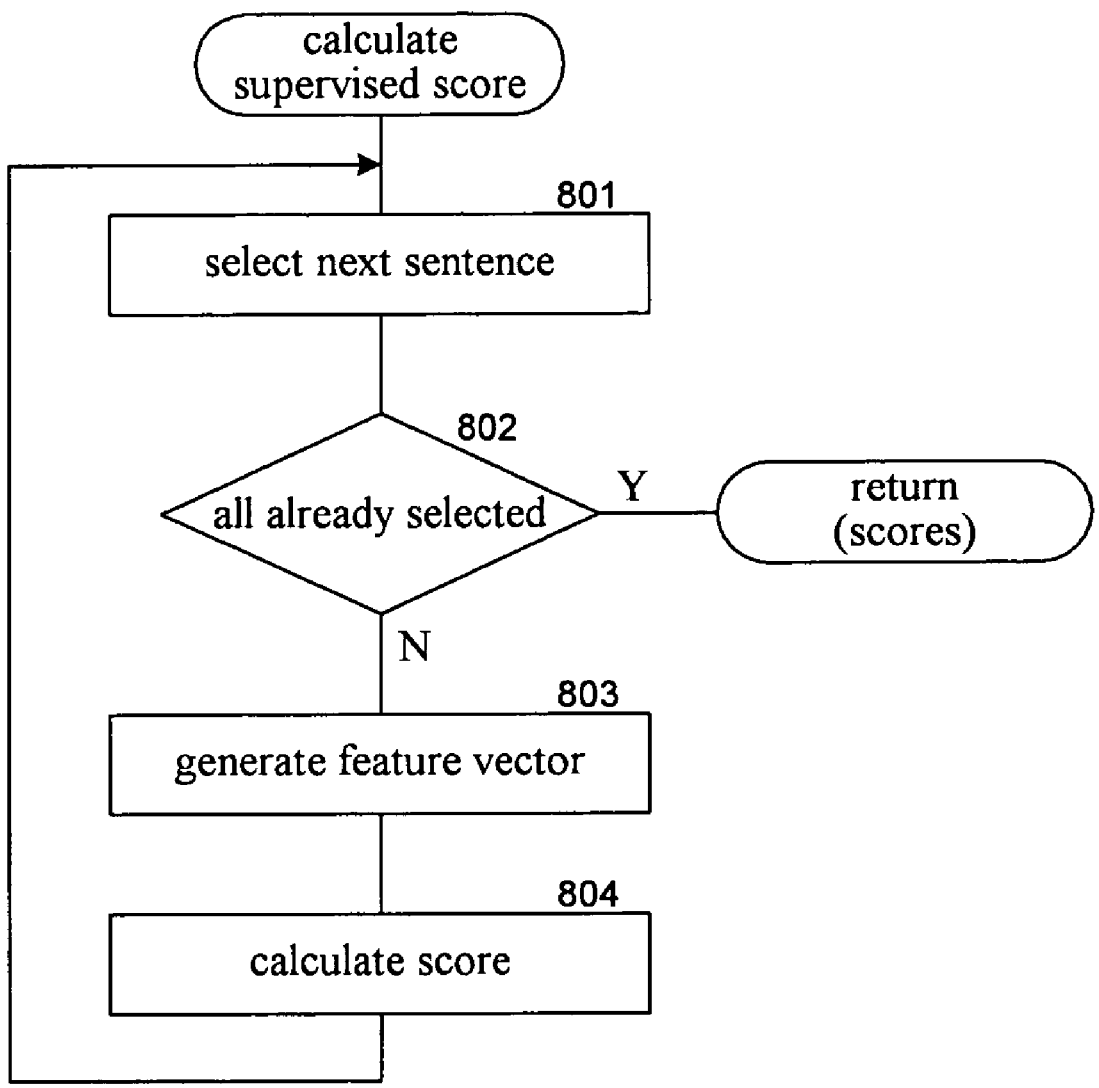
FIG. 8 is a flow diagram that illustrates the processing of the calculate supervised score component in one embodiment.

FIG. 8 is a flow diagram that illustrates the processing of the calculate supervised score component in one embodiment. The component is passed a web page and calculates a supervised score for each sentence of the web page. In block 801, the component selects the next sentence of the web page. In decision block 802, if all the sentences of the web page have already been selected, then the component returns the supervised scores, else the component continues at block 803. In block 803, the component generates the feature vector for the selected sentence. In block 804, the component calculates the score for the selected sentence using the generated feature vector and the learned summarize function. The component then loops to block 801 to select the next sentence.

Figure 9:
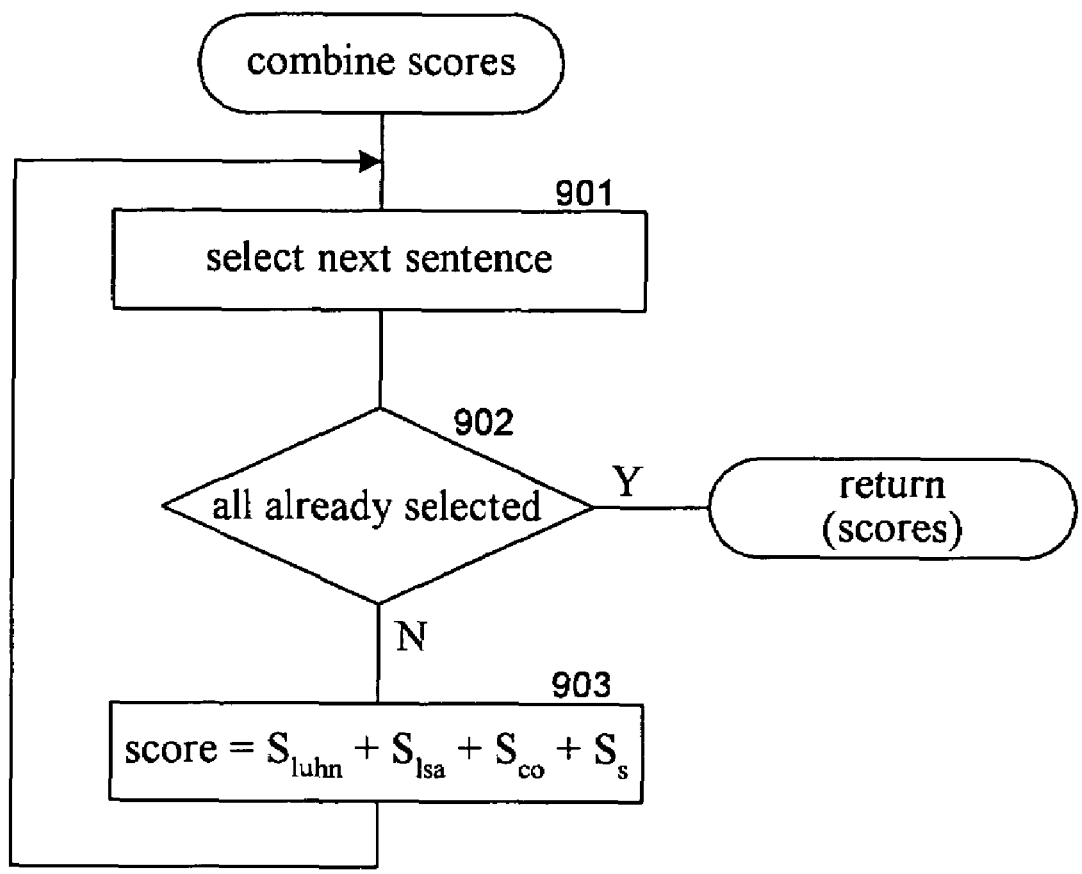
FIG. 9 is a flow diagram that illustrates the processing of the combine scores component in one embodiment.

FIG. 9 is a flow diagram that illustrates the processing of the combine scores component in one embodiment. The component generates a combined score for each sentence of a web page based on the Luhn score, the latent semantic analysis score, the content body score, and the supervised score. In block 901, the component selects the next sentence of the web page. In decision block 902, if all the sentences have already been selected, then the component returns the combined scores, else the component continues at block 903. In block 903, the component combines the scores for the selected sentence and then loops to block 901 to select the next sentence.

One skilled in the art will appreciate that although specific embodiments of the summarization system have been described herein for purposes of illustration, various modifications may be made without deviating from the spirit and scope of the invention. One skilled in the art will appreciate that classification refers to the process of identifying the class or category associated with a display page. The classes may be predefined. The attributes of a display page to be classified may be compared to attributes derived from other display pages that have been classified (e.g., a training set). Based on the comparison, the display page is classified into the class whose display page attributes are similar to those of the display page being classified. Clustering, in contrast, refers to the process of identifying from a set of display pages groups of display pages that are similar to each other. Accordingly, the invention is not limited except by the appended claims.

We claim:

1. A method in a computer system for classifying web pages, the method comprising:
   retrieving a web page;
   automatically generating a summary of the retrieved web page by
      identifying objects of the web page, the objects having sentences;
      building a term frequency by inverted document frequency index for each object;
      calculating similarity between pairs of objects based on the term frequency by inverted document frequency indexes of the objects;
      when the calculated similarity between a pair of objects satisfies a similarity threshold, linking the pair objects to indicate that the objects satisfy the threshold;
      selecting as a core object of the web page the object that has the most links;
      assigning high scores to sentences of the core object and to objects with links to the core object and low scores to all other sentences;
      selecting sentences to form the summary of the web page based on the assigned scores; and
   determining a classification for the retrieved web page based on the automatically generated summary.

2. The method of claim 1 wherein the automatically generating of the summary includes calculating a score for each sentence of the web page using multiple summarization techniques.

3. The method of claim 2 wherein the score for each sentence is a linear combination of the scores of the multiple summarization techniques.

4. The method of claim 1 wherein the sentences with the top scores are selected to form the summary.

5. The method of claim 2 wherein the summarization techniques include a Luhn summarization technique, a latent semantic analysis summarization technique, a content body summarization technique, and a supervised summarization technique.

6. The method of claim 2 wherein the summarization techniques include any two or more of the set of summarization techniques consisting of a Luhn summarization technique, a latent semantic analysis summarization technique, a content body summarization technique, and a supervised summarization technique.

7. The method of claim 1 wherein the determining of the classification uses a Naïve Bayesian classifier.

8. The method of claim 1 wherein the determining of the classification uses a support vector machine.

9. The method of claim 1 wherein the automatically generating of a summary uses a Luhn summarization technique.

10. The method of claim 1 wherein the automatically generating of a summary uses a latent semantic analysis summarization technique.

11. The method of claim 1 wherein the automatically generating of a summary uses a content body summarization technique.

12. The method of claim 1 wherein the automatically generating of a summary uses a supervised summarization technique.

13. A method in a computer system for summarizing a web page, the method comprising:
   retrieving the web page;
   for each sentence of the retrieved web page,
      assigning a score to the sentence based on multiple summarization techniques wherein one of the summarization techniques is
      identifying objects of the web page, the objects having sentences;
      building a term frequency by inverted document frequency index for each object;
      calculating similarity between pairs of objects based on the term frequency by inverted document frequency indexes of the objects;
      when the calculated similarity between a pair of objects satisfies a similarity threshold, linking the pair of objects to indicate that the objects satisfy the threshold;
      selecting as a core object of the web page the object that has the most links; and
      assigning a high score to sentences of the core object and to objects with links to the core object and a low score to all other sentences; and
      combining the scores assigned to the sentence to generate a combined score for the sentence; and
   selecting the sentences with the highest combined scores to form a summary of the retrieved web page.

14. The method of claim 13 wherein the combined score for each sentence is a linear combination of the assigned scores.

15. The method of claim 14 wherein the assigned scores of the multiple summarization techniques are weighted differently when combining.

16. The method of claim 13 wherein the summarization techniques include a Luhn summarization technique, a latent semantic analysis summarization technique, a content body summarization technique, and a supervised summarization technique.

17. The method of claim 13 wherein the summarization techniques include any two or more of the set of summarization techniques consisting of a Luhn summarization technique, a latent semantic analysis summarization technique, a content body summarization technique, and a supervised summarization technique.

18. The method of claim 13 wherein a summarization technique is a Luhn summarization technique in which a classification has a collection of significant words.

19. The method of claim 18 wherein noisy words are discarded from a collection.

20. The method of claim 13 wherein a summarization technique is a supervised summarization technique in which a sentence is represented by a set of features that includes a feature based on similarity between the sentence and metadata of the web page.

21. The method of claim 13 wherein a summarization technique is a supervised summarization technique in which a sentence is represented by a set of features that includes a feature based on words of the sentence that are highlighted in the web page.

22. The method of claim 13 wherein a summarization technique is a supervised summarization technique in which a sentence is represented by a set of features that includes a feature based on font size of words in the sentence.

23. The method of claim 13 including identifying a classification for the retrieved web page based on the summary of the retrieved web page.

24. The method of claim 23 wherein the identifying of the classification uses a Naïve Bayesian classifier.

25. The method of claim 23 wherein the identifying of the classification uses a support vector machine.

26. A computer-readable storage medium containing instructions for causing a computer system to generate a summary for a display page by a method comprising:
   for each sentence of the display page, generating a score that is based on multiple summarization techniques wherein one of the summarization techniques is
   calculating similarity between pairs of objects of the display page, the objects having sentences;
   when the calculated similarity between a pair of objects satisfies a similarity threshold, linking the pair of objects to indicate that the objects satisfy the threshold;
   selecting as a core object of the display page the object that has the most links; and
   assigning high score to sentences of the core object and to objects with links to the core object and low score to all other sentences; and
   selecting the sentences with the highest generated scores to form a summary of the display page.

27. The computer-readable medium of claim 26 wherein the generated score for each sentence is a combination of a score for each of the multiple summarization techniques.

28. The computer-readable medium of claim 27 wherein the scores of the multiple summarization techniques are weighted differently.

29. The computer-readable medium of claim 26 wherein the summarization techniques include a Luhn summarization technique, a latent semantic analysis summarization technique, a content body summarization technique, and a supervised summarization technique.

30. The computer-readable medium of claim 26 wherein the summarization techniques include any two or more of the set of summarization techniques consisting of a Luhn summarization technique, a latent semantic analysis summarization technique, a content body summarization technique, and a supervised summarization technique.

31. The computer-readable medium of claim 26 wherein a summarization technique is a Luhn summarization technique in which a classification has a collection of significant words.

32. The computer-readable medium of claim 31 wherein noisy words are discarded from the collection.

33. The computer-readable medium of claim 26 wherein a summarization technique is a supervised summarization technique in which a sentence is represented by a set of features that includes a feature based on similarity between the sentence and metadata of the display page.

34. The computer-readable medium of claim 26 wherein a summarization technique is a supervised summarization technique in which a sentence is represented by a set of features that includes a feature based on words of the sentence that are highlighted in the display page.

35. The computer-readable medium of claim 26 wherein a summarization technique is a supervised summarization technique in which a sentence is represented by a set of features that includes a feature based on font size of words in the sentence.

36. The computer-readable medium of claim 26 including identifying a classification for the display page based on the summary of the display page.

37. A computer system embodied on a computer-readable storage medium for classifying display pages, comprising:
   means for automatically generating a summary of the display page by
      calculating similarity between pairs of objects of the display page, the objects having sentences;
      when the calculated similarity between a pair of objects satisfies a similarity threshold, linking the pair of objects to indicate that the objects satisfy the threshold;
      selecting as a core object of the display page the object that has the most links; and
      selecting sentences of the core object and objects with links to the core object to form the summary of the display page; and
   means for identifying a classification for the display page based on the automatically generated summary.

38. The computer system of claim 37 wherein the means for automatically generating the summary calculates a score for each sentence of the display page using multiple summarization techniques.

39. The computer system of claim 38 wherein the score for each sentence is a linear combination of the scores of the multiple summarization techniques.

40. The computer system of claim 37 wherein the summarization techniques include a Luhn summarization technique, a latent semantic analysis summarization technique, a content body summarization technique, and a supervised summarization technique.

41. The computer system of claim 37 wherein the summarization techniques include any two or more of the set of summarization techniques consisting of a Luhn summarization technique, a latent semantic analysis summarization technique, a content body summarization technique, and a supervised summarization technique.

42. The computer system of claim 41 wherein each sentence of the display page is assigned a score that is a combination of the scores of the multiple summarization techniques.

\* \* \* \* \*